Figure 1:
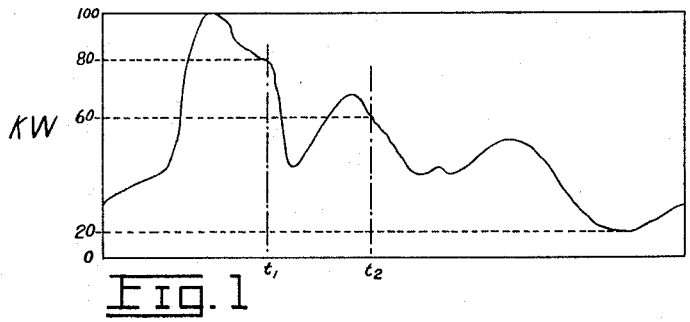

May 12, 1964            T. WILDI            3,133,202

PEAK LOAD STABILIZER OR CONTROLLER

Filed April 6, 1961            2 Sheets-Sheet 1

INVENTOR
Theodore WILDI

BY

ATTORNEYS

INVENTOR
Theodore WILDI

United States Patent Office 3,133,202
Patented May 12, 1964

3,133,202
PEAK LOAD STABILIZER OR CONTROLLER
Theodore Wildi, 1365 de Longueuil, Quebec,
Quebec, Canada
Filed Apr. 6, 1961, Ser. No. 101,176
6 Claims. (Cl. 307—38)

It is well-known that the electrical load in factories, institutions and private homes is subject to appreciable daily fluctuation and seasonal variations. The maximum demand is established by the customer's basic requirements, and is usually "averaged" over periods varying from 15 minutes to perhaps 30 minutes by means of suitable demand meters.

The financial charges to the power consumer are generally a combined function of both this maximum demand and the total electrical energy consumed during the period for which these charges are computed. The rate systems employed in many instances are such that any energy in excess of the base factory requirement can be purchased at very low cost. Figures of the order of 0.5 cents per kw.h. are typical, and this compares favourably with the price of other types of energy which are presently available.

Such rate systems make it advantageous for the consumer to utilize as much electrical power as possible (in lieu of other types of power) provided that the maximum demand is not exceeded at any time. In the ideal case, the electrical user would be inclined to consume energy at a constant rate, equal to the maximum demand. Clearly, such a state of affairs would also tend to improve the utility company's load factor.

It is useful at this point to define the base factory load as being that load which is indispensable during periods of full productive operation and which therefore cannot as a whole or in part be switched off without ill effect on the good operation of the industry. The off-peak load can be defined as that load which can be switched off temporarily at any time even during fully productive operation without effect on the said operation.

It is the object of the present invention to provide a control system whereby off-peak loads can be switched on or off automatically in order to keep the demand of electrical energy below or at a pre-set upper limit which is equivalent in most cases to the maximum base factory load defined herein before and not in excess of that upper limit for any significant periods of time, i.e. periods of time that are negligible with respect to the averaging period of a demand meter. The minimum requirements that must be met by such a system are as follows:

The control system must be automatic.
The control system respond to the total electrical load, which includes both the base load and the off-peak load.
It should be able to switch off-peak loads in such a way that the maximum demand registered by a demand meter is approached as closely as possible but never exceeded.
The control system should be capable of giving preference to certain off-peak loads.
In addition, the following characteristics are desirable.
The control system should be able to accommodate off-peak loads of equal or of different ratings up to a power ratio of 2 to 1.
It should be able to operate for three-phase balanced or unbalanced power lines.
The load controller should have a calibrated dial, so as to enable the power user to set the desired maximum demand according to his requirements.
The control system should be relatively inexpensive.

All these requirements are met by a motor controlled peak load stabilizer in accordance with the present invention.

Figure 2:
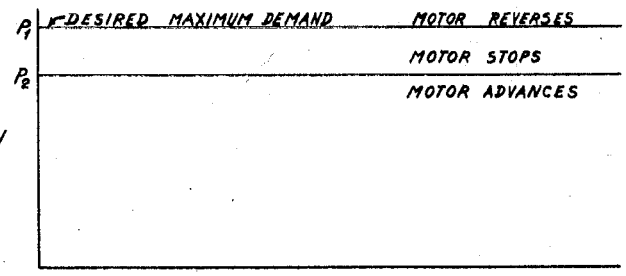
Figure 3:
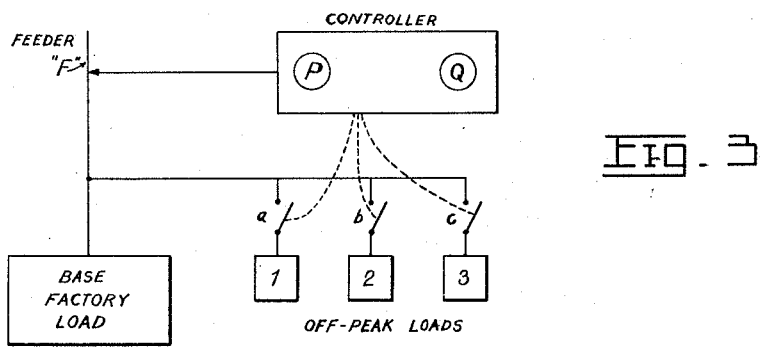
Figure 5:
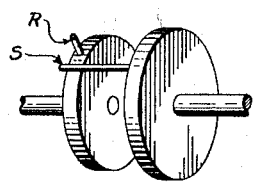
Figure 4:
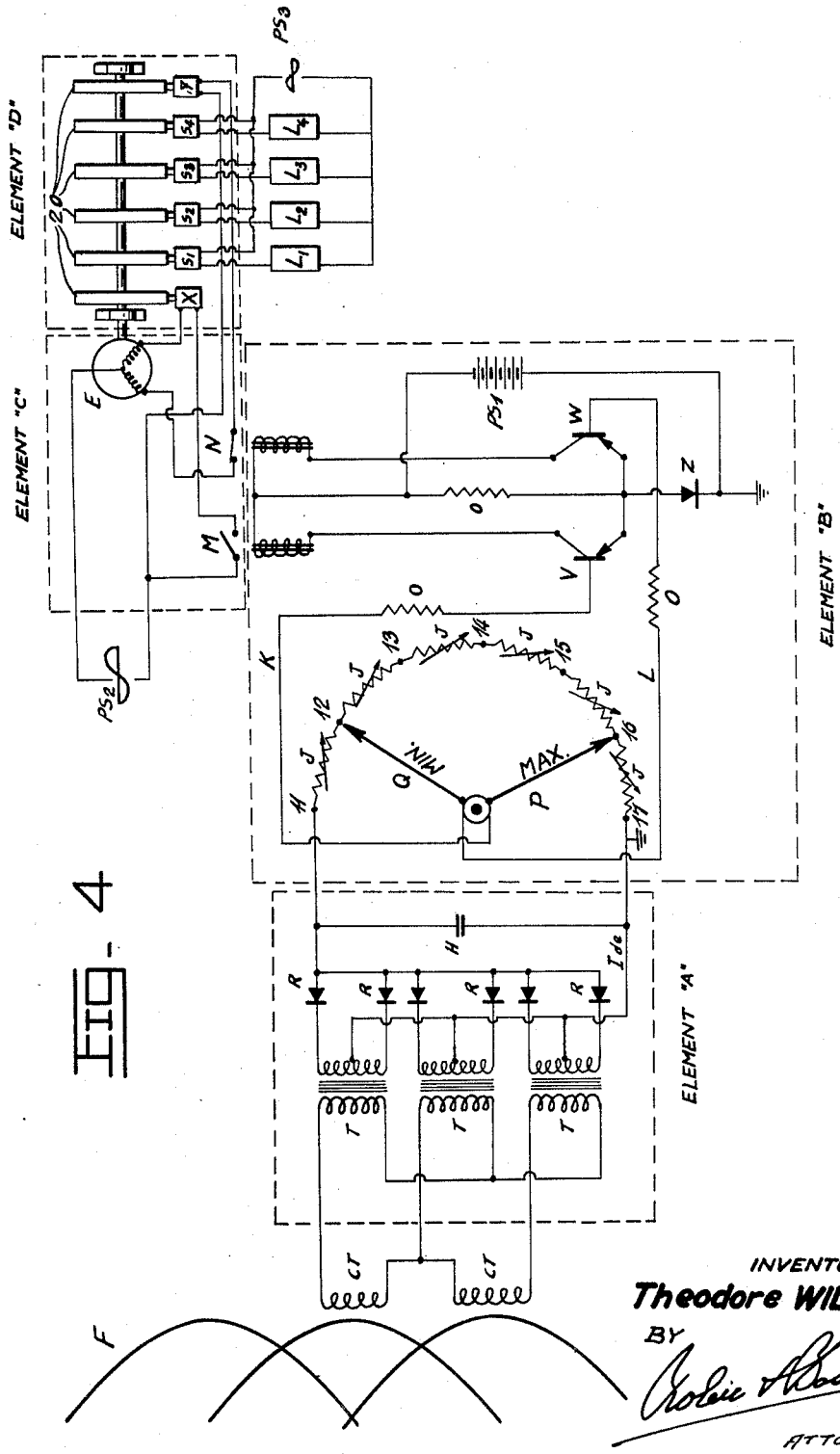

In the accompanying drawings:
FIG. 1 shows the typical load curve of a small factory for one day.
FIG. 2 is a graph showing the principle of operation of the controller.
FIG. 3 is a general diagram of the system.
FIG. 4 is a detailed circuit diagram of the system.
FIG. 5 is a drawing of the push-driven coupling between the motor and the cam assembly.

FIGURE 1 shows the typical load curve of a small factory for a period of one day. The maximum demand of 100 kw. is attained only once, and it is evident that additional loads could be added for the remainder of that day. At time $t_1$ for instance, the factory load is 80 kw., and an extra 20 kw. could be added without exceeding the maximum demand. On the other hand, at time $t_2$ the additional load could be as high as 40 kw., and at other times much higher.

In the ideal case off-peaks loads could be added in such a way that the total power is always equal to the maximum demand. Electric boilers and other loads which can be shut off automatically without inconvenience to the user are ideally suited for off-peak operation.

Returning to FIG. 1, it can be seen that the off-peak available power varies from zero to as much as 80 kw. A single off-peak load of 80 kw. could only be on for a very short time, for as soon as the base factory load is more than 20 kw., the maximum demand would be exceeded.

On the other hand, by breaking up this 80 kw. off-peak load into a number of individual smaller loads, say 8 individual 10 kw. loads, then an appropriate number of these loads can be switched in, so as to approach the maximum demand as closely as possible. For instance, if the base factory load at a given time is 65 kw., 35 kw. of off-peak power are available. This means that three of the aforementioned 10 kw. loads can be switched in without exceeding the desired maximum demand.

In this basis, the total factory load (base and off-peak) can always be kept between 90 kw. and 100 kw., and on the average approximately 95 kw. The invention offers a means of switching these off-peak loads automatically so that the total load is always between say 90 kw. and 100 kw.

It often occurs that one of the off-peak loads is more important than the others. Under these circumstances it is desirable that this particular load be given preferential treatment i.e. by having it switched on first, and switched off last.

Since some off-peak loads may be thermostatically controlled, it is desirable that another off-peak load be switched on, whenever the thermostat or other auxiliary control temporarily disconnects one of the previously operating loads.

The controller according to the invention is provided with two calibrated tap-switches P and Q (FIG. 3) which can be set as required by the electrical user. Tap-switch P establishes the desired maximum demand $P_1$ (FIG. 2). Tap-switch Q is set at a power $P_2$ which is slightly less than $(P_1-U)$, where U is the power of the largest individual off-peak load.

The total power delivered by the feeder F is monitored by the controller. When this power is less than $P_2$ the motor in the controller turns so as to close the contactors $a$, $b$, $c$ and switch in the off-peak loads 1, 2 and 3 in that sequence. This sequential closure produces a stepped increase in the power over feeder F. Should the addition of one or more of the off-peak loads now cause the total power to lie between $P_1$ and $P_2$, the motor will automatically stop.

Conversely, if the total load subsequently increases to a value in excess of $P_1$, the motor will reverse, and will thereby progressively open the contactors in the sequence c–b–a. When the total power falls below $P_1$ (due to the disconnection of one or more of the off-peak loads), the motor will stop, but the remaining off-peak loads will be kept in operation.

It is clear that this motor action will tend to keep the total power between $P_1$ and $P_2$. Furthermore, it can be seen that $(P_1-P_2)$ must be greater than the power of the largest individual off-peak loads, otherwise hunting may result.

The diagram of FIG. 4 shows in detail the main components of a three-phase three-wire controller, which is capable of performing the required operations on 4 individual off-peak loads. It is composed of four principal elements A, B, C and D.

Element A is the power-sensing device. In the interests of economy, it may be made sensitive to the feeder currents only, and tests to date have shown that this is a satisfactory measure of power when the feeder voltage is reasonably constant. Transformers T and rectifiers R convert the alternating currents supplied by the current transformers CT into a direct current. The current transformers CT are connected to the incoming factory feeders. The action of the circuit is such that the current $I_{de}$ is proportional to the arithmetic sum of the effective feeder currents.

Theoretical calculations show that this sum is closely proportional to the total power even for unequally loaded three-phase lines, provided the feeder voltage is balanced and constant. Thus at unity power factor and a constant balanced line voltage if the line currents are for example, in the ratio of 26 to 36 to 43 the error which results, by taking the arithmetic sum of the root-mean square currents as a measure of apparent power (in volt-amperes), is only 2%. Condenser H is used for filtering purposes, so as to ensure a ripple-free D.C. voltage across the adjustable rheostats. This voltage is proportional to the current $I_{de}$.

Element B comprises a number of adjustable rheostats J (six in the diagram), two tap-switches P and Q, two transistors V, W, two relays M, N, one Zener diode Z and a conventional low-voltage D.C. power supply $PS_1$. In the actual peak load controller, this D.C. power supply would be obtained by rectifying a convenient alternating voltage rather than by using batteries as depicted in FIG. 4.

The rheostats are pre-set so that the voltage appearing between points 12, 13, 14, etc., and ground is a fixed percentage of the total voltage between lead 11 and ground. Switches P and Q are selectively connected respectively to two of these points (16 and 12 in the diagram). A higher numerical setting of the tap-switches corresponds to a greater load.

The Zener diode provides a reference voltage against which the tap-switch voltages K and L are compared. When the voltage between K or L and ground is slightly greater than this reference voltage, the respective transistors will conduct, and the relays M and/or N will operate. Since tap-switch Q is always set for a lower power than tap-switch P, it follows that for an increasing load, normally closed relay N will operate before relay M.

For load powers below the setting of tap-switch Q, neither relay operates, and the motor E (in element C) will turn so as to switch in the off-peak loads. On the other hand, if the total load lies between the setting of P and Q relay contacts N will open, and the motor will cease to turn. Finally, if the total load exceeds the desired maximum demand setting of tap-switch P, both relays will be operating and the motor will reverse.

Normally-closed contacts X and Y are limit switches to stop the motor when it has reached the limit of its travel in either the forward or reverse directions.

The motor is a small 1 r.p.m. shaded-pole machine with "forward" and "reverse" windings. In drives element "D" which is composed of a group of cams 20 which operate the micro-switches X, S1, S2, S3, S4, and Y. The micro-switches may be used to operate the holding coils of associated magnetic contactors L1, L2, L3 and L4. The low voltage A.C. power supply $PS_2$ and $PS_3$ for the controller and for the contactors may be taken from any convenient outlet.

In order to obtain a high degree of reliability, silicon diodes and transistors are used throughout. Protection of the controller against feeder short-circuits and momentary overloads is obtained by means of 5 k. resistors O in series with the base of the transistors. The condenser H also affords a certain amount of short-time protection but this is only an incidental benefit.

The number of controlled off-peak loads can be increased by adding the necessary cams and micro-switches to element D. The remainder of the circuit requires no further modification. This feature permits the use of the spare off-peak circuits for future use, at very little increase in cost.

Off-peak loads of varying degrees of importance can be connected to the appropriate micro-switches. Thus, the action and shape of the cams 20 is such that in the forward direction the sequence is S1–S2–S3–S4, and in the reverse direction the sequence becomes S4–S3–S2–S1. The least important off-peak load is connected to micro-switch S4, and the most important to micro-switch S1.

The shaft which bears the cams is not directly connected to the motor shaft but is push-driven by means of a coupling similar to that depicted in FIG. 5. The motor will only start to rotate the cams when the pin R pushes upon pin S. The purpose of this type of coupling is to prevent the controller from responding to momentary load changes which last for less than about one minute. This type of coupling also restricts the hunting period of the controller to about one minute, in the even that one of the off-peak loads has a rating greater than $(P_1-P_2)$ in FIGURE 2. This arrangement also permits the accommodation of off-peak loads whose individual power ratings are in a ratio of as much as 2:1, without exceeding the desired maximum demand.

Off-peak loads having vastly different ratings (power ratio greater than 2:1) can be accommodated by modifying the shape of the cams.

In conclusion the present off-peak controller has certain features which are attractive to both the electrical utilities and the power consumer. The installation costs are low, and the setting of the upper and lower power limits $P_1$ and $P_2$ by means of the tap-switches presents no particular problem to the average electrical contractor. Load power curves taken at one installation have also shown that the off-peak controller maintains the power very close to the desired maximum demand.

The same principles can be employed for the control of off-peak loads in single-phase systems. Only one transformer and two rectifiers are then necessary in element A of FIGURE 4, and the remainder of the circuit is left unchanged.

What I claim:

1. An off-peak load control system for a circuit having a feeder line, a base load with a predetermined maximum demand and a plurality of off-peak loads; said system comprising a transformer and rectifier system to convert the alternating currents supplied by the feeder lines into direct current, a series of rheostats to carry said direct current, two tap switches connected to said rheostats at points corresponding respectively to said maximum demand and to a minimum defined by said maximum demand less the largest of said off-peak loads, a normally open relay connected to said maximum tap switch, a normally closed relay connected to said minimum tap switch, a switch between said feeder line and each of said off-peak loads, a reversible motor associated with said switches to operate said switches in a given sequence, said motor being connected to said relays to operate in a given sense so as to close said switches in said given sequence only when said direct current is below said minimum and said minimum relay contact is closed, and to start again in reverse so as to open said switches in inverse sequence only when said current exceeds said maximum and said maximum relay contact closes and to stop whenever said direct current has a value intermediate between said maximum and said minimum.

2. A control system according to claim 1, comprising a transistor connected between each tap switch and the corresponding relay, a direct current source connected to said relays, and a Zener diode between said relays and said direct current source to provide a reference voltage.

3. A control system according to claim 1, comprising a cam assembly driven by said motor to operate said switches.

4. A control system according to claim 1, comprising a cam assembly push-driven by said motor to operate said switches so that the successive opening and closing of said switches is restricted to a specific interval of time.

5. A control system according to claim 1, comprising a limit switch in series with each contact of said relays, to open the circuit of said motor when the motor reaches either of its limit positions.

6. A control system according to claim 1, comprising a transistor power amplifier connected between each tap switch and the corresponding relay, a direct current source connected to said relays and a Zener diode between said relays and said direct current source to provide a reference voltage against which the voltages of each setting of the tap switches are compared.

References Cited in the file of this patent

UNITED STATES PATENTS

| | | |
|---|---|---|
| 1,673,116 | Jenkins | June 12, 1928 |
| 1,871,170 | Fryer | Aug. 9, 1932 |
| 2,641,716 | Heyer et al. | June 9, 1953 |